United States Patent [19]

Dunmead et al.

[11] Patent Number: 5,372,797
[45] Date of Patent: Dec. 13, 1994

[54] LOW TEMPERATURE METHOD FOR SYNTHESIZING MICROGRAIN TUNGSTEN CARBIDE

[75] Inventors: Stephen D. Dunmead; William G. Moore, both of Midland, Mich.

[73] Assignee: The Dow Chemical Company, Midland, Mich.

[21] Appl. No.: 50,945

[22] Filed: Apr. 21, 1993

Related U.S. Application Data

[63] Continuation-in-part of Ser. No. 795,135, Nov. 20, 1991, abandoned.

[51] Int. Cl.$^5$ .............................................. C01B 31/34
[52] U.S. Cl. .................................... 423/430; 423/439
[58] Field of Search ................... 423/439, 440; 501/87, 501/93, 307

[56] References Cited

U.S. PATENT DOCUMENTS

| | | | |
|---|---|---|---|
| 3,932,594 | 1/1976 | Gortsema | 423/440 |
| 4,115,526 | 9/1978 | Auborn et al. | 423/440 |
| 4,460,097 | 7/1984 | Hara et al. | 423/440 |
| 4,515,763 | 5/1985 | Boudart et al. | 423/440 |
| 4,851,206 | 7/1989 | Boudart et al. | 423/440 |

FOREIGN PATENT DOCUMENTS

| | | | |
|---|---|---|---|
| 765758 | 8/1967 | Canada | 423/440 |
| 133026 | 11/1978 | Germany | 423/440 |
| 59-026909 | 2/1984 | Japan | |
| 1115810 | 5/1989 | Japan | |

OTHER PUBLICATIONS

Newkirk et al., "The Preparation of Tungsten Carbide", J. of American Society, 5 Sep. 1957, vol. 79, No. 17, pp. 4629–4631.

Primary Examiner—Michael Lewis
Assistant Examiner—Stephen G. Kalinchak
Attorney, Agent, or Firm—Dan R. Howard

[57] ABSTRACT

A method for forming monotungsten carbide, comprising heating a solid, non-elemental tungsten-containing material in a flowing atmosphere containing molecular hydrogen and molecular methane for a time sufficient to convert substantially all of the tungsten-containing material to monotungsten carbide, The heating brings the temperature of the tungsten-containing material to a first elevated temperature of from about 520 to about 550° C. and, subsequently, at a rate of from about 3 to about 10° C. per minute, the heating brings the temperature from the first elevated temperature to a second elevated temperature of about 800 to about 900° C. Thereafter the temperature is held at the second elevated temperature for at least about 15 minutes. At least about 50 weight percent of the monotungsten carbide formed is formed while holding the temperature at the second elevated temperature.

17 Claims, No Drawings

LOW TEMPERATURE METHOD FOR SYNTHESIZING MICROGRAIN TUNGSTEN CARBIDE

This is a continuation-in-part of co-pending application U.S. Ser. No. 07/795,135 filed on Nov. 20, 1991now abandoned.

TECHNICAL FIELD

This invention relates generally to a method of converting tungsten trioxide to monotungsten carbide.

BACKGROUND OF THE INVENTION

Tungsten carbide is a ceramic material having good chemical stability and corrosion resistance. It has been said to be the strongest of all structural materials, having high hardness, wear resistance and temperature resistance. Tungsten carbide powders are used to form cemented carbides, dies and cutting tools, wear resistant parts, cermets and electrical resistors, and are used as abrasives in liquids. Cemented tungsten carbides are mixtures of about 80 to 95 percent by weight tungsten carbide and about 5 to 20 percent by weight cobalt or other ductile metal as a binder phase. Cemented tungsten carbides are useful for forming tools and as abrasives for machining and grinding metals, rock, molded products, porcelain and glass. Cemented tungsten carbides are also useful in gages, blast nozzles, knives and drill bits.

Articles can be manufactured from tungsten carbide powder in a variety of ways. The most common ways of forming articles from tungsten carbide are hot pressing, cold pressing followed by sintering, and slip-casting (paste molding) followed by sintering. The method disclosed in U.S. Pat. No. 5,041,261 (Buljan et al.) is a recent example involving presintering followed by hot isostatic pressing.

The properties ultimately possessed by such articles are dependent to a great extent upon the grain size of the tungsten carbide employed and the conditions of sintering. Certain tungsten carbides of fine grain or particle sizes (known as micrograin tungsten carbides) from 0.05 to 0.2 micrometers in diameter are especially useful for certain purposes, such as end milling and circuit board drilling applications.

Particularly with micrograin materials, it is preferred to employ particles having a controlled morphology, a narrow size distribution, a well-defined stoichiometry and relatively high purity. While there are a variety of processes known for preparing tungsten carbide powders, many of them achieve particle sizes well above micrograin size. Micrograin tungsten carbide is not readily prepared from larger tungsten carbide particles, because the same hardness for which tungsten carbide is valued also impairs or prevents the mechanical reduction of large tungsten carbide particles to a smaller size by conventional methods such as grinding or milling. For example, it has been known to form small particles of other metal carbides by the single-step carbothermal reduction of a finely divided mixture of the metal oxide with carbon at a high temperature under a protective atmosphere, in which the resulting lumps of metal carbide are broken up by jaw crusher and then finely milled into powders of appropriate size. The hardness of tungsten carbide makes such a method unsuitable for the production of micrograin tungsten carbide. Accordingly, it would be very desirable to directly manufacture tungsten carbide particles having a small initial size, rather than to create an intermediate tungsten carbide which must then be reduced in size.

Is is known that some metal carbides cart be produced by the carbothermal reduction of a metal oxide with solid carbon under a reducing atmosphere, for example, under a hydrogen atmosphere. However, the direct carbothermal reduction of tungsten trioxide (or another solid, tungsten-containing material) with carbon in a molecular hydrogen atmosphere has not conventionally been viewed as possible. For example, it is noted in Funtai Oyobi Funmatsuyakin, v. 22(1), pp. 12–16 (1975) (Chemical Abstracts 88(24):175199r) that the reduction of tungsten trioxide by hydrogen occurs preferentially over the reduction of tungsten trioxide by carbon when a mixture of tungsten trioxide and carbon is heated in an atmosphere of molecular hydrogen. The final reduction step, the reduction of tungsten monoxide to tungsten metal by molecular hydrogen, produces water which reacts with the carbon that is present. The quantity of water affects the carbon content of the tungsten carbide ultimately produced. It is the belief of the present Applicants that the partial pressure of water is an important factor in the material transport for growth of tungsten crystal particles which are subsequently converted to tungsten carbide, and that the most significant reaction is that of water vapor with tungsten trioxide directly, yielding relatively volatile ortho- tungstic acid.

A variety of other processes have also been employed to make fine tungsten carbide powders. While they have each enjoyed relative success, they have also individually been subject to a variety of drawbacks. In general, the prior processes have been relatively expensive in requiring substantial capital investment in gas composition control systems and particle collection systems, while yielding products having large variations in particle size and relatively low yields. While these drawbacks are particularly evident with gas-phase methods (entailing the reaction of at least two gaseous reactants heated in a furnace, or heated by RF induction or plasma) they are also present in other methods.

U.S. Pat. No. 4,172,808 (Bohm et al.) is directed to a method for forming tungsten carbide by directing a mixture of carbon monoxide and carbon dioxide over tungsten oxide, while heating it in a heated reactor at a heating rate and gas flow rate such that the reduction of the tungsten oxide occurs more slowly than the diffusion of the carbon into the tungsten. Funtai Oyobi Funmatsuyakin, v. 26(2), pp. 72–77 (1979) (Chemical Abstracts 91(10):77333x) discloses a process for the direct production of tungsten carbide from tungsten oxide, entailing heating a granulated mixture of tungsten oxide and carbon powder in a rotary carburization furnace having graphite furnace elements. The powder was continuously fed into the furnace at a temperature of 1150° to 1650° C. It was asserted that the carbon content of the carburized product could be controlled by controlling the ratio of the partial pressure of the carbon dioxide to the partial pressure of the carbon monoxide formed during the reaction. Each of these references possesses the disadvantage that the partial pressures of carbon monoxide and/or carbon dioxide gas must be controlled throughout them.

U.S. Pat. No. 4,008,090 (Miyake et al.) discloses a two-step process for the production of tungsten (or a mixed metal) carbide, in which reduction of tungsten oxide to tungsten takes place in the presence of carbon black in an inert gas at 1000° to 1600° C., while carburization of the tungsten thereafter takes place in a hydrogen atmosphere at 1400° to 2000° C. The first step yields a mixed carbide of tungsten, ditungsten carbide and tungsten carbide. (The reference discloses a comparative example in which tungsten oxide and carbon black are carbonized in a hydrogen atmosphere at 1400°, 1600° or 1800° C. but which yields an unsatisfactory product.) This process is disadvantageous in requiring the isolation of an intermediate and requiring two different heating atmospheres at high temperatures.

U.S. Pat. No. 4,115,526 (Auborn et al.) is directed to a method for producing fine particle size tungsten or tungsten carbide which entails a first step of reducing tungsten oxide in hydrogen under conditions which avoid the formation of tungsten oxide whiskers, the resulting powder then being subject to carburization in a methane atmosphere. This process is disadvantageous in requiring two different atmospheres.

U.S. Pat. No. 4,460,697 (Hara et al.) discloses a method for synthesizing tungsten carbide from tungsten oxide by heating tungsten oxide to greater than 800° C. in the presence of reducing and carbonizing gases, either sequentially or at the same time. When both reducing and carbonizing gases are employed at the same time, the gases are placed in a plasma condition. Fine tungsten carbide particle sizes on the order of 0.1 micrometers are obtained from the rapid cooling (10,000° C. per second or faster) of the tungsten oxide from a plasma state prior to carbonizing. The disclosed process is disadvantageous in requiring plasma-condition treatment of the reactant material at some time during the process. The disclosed process also fails to obtain micrograin tungsten carbide in particularly useful sizes, below 0.3 micrometers, and especially below 0.1 micrometers. Moreover, like other plasma methods, the reference requires close control of the large thermal and reactant concentration gradients within the plasma reaction zone. Plasma methods entail the use of a large volume of gas through the reaction zone, and require large collection systems such as filters or electrostatic precipitators. Low yields and large variations in particle size are encountered as well, due to the temperature gradients.

U.S. Pat. No. 4,851,206, to Boudart, et al. discloses a method for making high specific surface area carbides by thermal reduction of oxides in the presence of a source of carbon with relatively slow progressive temperature increases prior to completion of the reaction, followed by quenching. Tungsten carbide is listed as one of the carbides that may be formed by Boudart, et al's method, although no process temperatures are recited in the patent for making tungsten carbide.

Boudart, et al. compare the results of their method of carburizing an oxide to form a carbide to results of carburizing a different reactant, i.e., the elemental metal, to form a carbide. Specifically, Boudart, et al. teach that the carbide product formed by their method has a substantially higher specific surface area than is obtained when the elemental metal is contacted with a carbon source at a fixed temperature and the reaction allowed to go to completion.

The carbide product formed in Boudart, et al. is said to have a specific surface area of at least 40 $m^2/g$ and generally have a particle size in the range of about 1 to 15 nanometers, which is useful when used as a catalyst. However, tungsten carbide having such a high surface area and small particle size is not desirable in many processes or applications.

Firstly, tungsten carbide having a particle size of 1 to 15 nm is so highly reactive that it is pyrophoric. Being pyrophoric renders the material hazardous, in that it must be guarded against spontaneous burning or exploding.

Secondly, it is a fact that the oxide content of tungsten carbide is proportional to the particles' surface area. Tungsten carbide prepared by the method of Boudart, et al., that is, having a specific surface areas of at least 40 $m^2/g$, is difficultly, if not impossibly, used for making wear-resistant articles, as the parts made by such powders would be too weak due to the high oxide content.

The tungsten oxide used in the Boudart, et al. process is said to generally have a specific surface area from 0.1 to 10 $m^2/g$. Tungsten oxide having this particle size is not the most widely available tungsten oxide.

It is therefore an object of the present invention to convert tungsten trioxide or another solid, non-elemental tungsten-containing material to monotungsten carbide directly with a substantially single reaction atmosphere of substantially consistent composition.

It is a further object of the present invention to produce micrograin monotungsten carbide of good purity and relatively uniform particle size without requiring an appreciable investment in atmospheric controls or particle collection systems.

It is yet another object of the present invention to provide a method of producing micrograin monotungsten carbide at a relatively low reaction temperature.

It is another object of the present invention to provide a relatively inexpensive method of producing monotungsten carbide which is simpler than prior methods, yet which obviates the need for isolation or cooling of an intermediate product; for the addition of carbon to an intermediate product; for control over the ratio of the partial pressures of carbon monoxide and/or carbon dioxide in the treatment atmosphere; and for changing the proportions of the atmosphere during treatment.

It is also an object of the present invention to form tungsten carbide having a particle size from about 50 to about 200 nanometers, which is excellent for manufacturing wear-resistant articles (e.g. cutting tools and end mills) and is non-pyrophoric and, therefore, safe to use.

It is also an object of the present invention to employ widely available tungsten oxide particles having a surface area of 0.01 to 0.09 $m^2/g$.

It is yet another object of the present invention to provide a method of making tungsten carbide capable of being used in a continuous mode, thereby making the manufacturing of tungsten carbide commercially viable.

SUMMARY OF THE INVENTION

In accordance with the preferred embodiment of the invention, these and other objects and advantages are addressed as follows:

The present invention concerns a method for forming monotungsten carbide, which method comprises heating a solid, non-elemental tungsten-containing material in a flowing atmosphere containing molecular hydrogen and molecular methane for a time sufficient to convert substantially all of the tungsten-containing material to monotungsten carbide. The heating step of the method brings the temperature of the tungsten-containing material to a first elevated temperature of from about 520° to about 550° C. and, subsequently, at a rate of from about 3° to about 10° C. per minute, the heating step brings the temperature from the first elevated temperature to a second elevated temperature of about 800° to about 900° C. Thereafter the second elevated temperature is held for at least about 15 minutes to form monotungsten carbide. With the present invention, at least about 50 weight percent of the monotungsten carbide formed is formed while holding the temperature at the second elevated temperature. The temperature control during the reaction is conducted such that at least about 50 weight percent of the monotungsten carbide formed is formed while holding the temperature at the second elevated temperature.

DETAILED DESCRIPTION OF THE INVENTION

Applicants have discovered that the growth of monotungsten carbide particles in the micrograin size range can be selectively controlled during the conversion of tungsten trioxide or other non-elemental tungsten-containing solid materials to monotungsten carbide. The reduction of tungsten trioxide is representative of the reduction of such other materials. Accordingly, subsequent reference to tungsten trioxide is to be understood as including such other materials and as exemplifying such other materials, so long as they are subject to reduction to tungsten in hydrogen. Ammonium paratungstate is one such material.

A review of the various reactions involved will provide a basis for better appreciation of the nature of the invention. Recall that the desired reduction reaction of tungsten trioxide to tungsten metal in a hydrogen atmosphere is:

(1) $WO_3 + 3H_2 \longrightarrow W + 3H_2O$.

Below about 535° C., however, this reaction is incomplete. For example, at 325° C., the solid product is not tungsten, but is instead a composition having the approximate formula WO2.8; at 425° C., WO2.72; and at 450° C., WO2.0. Only when the reaction temperature approaches 535° C. is the solid product from the reaction substantially a tungsten metal powder.

The desired reduction reaction is temperature sensitive above this point. When the reaction takes place at 537° C., the tungsten powder produced has an average diameter of about 0.05 micrometers. At higher temperatures, larger particles are obtained. For example, at a reaction temperature of 900° C., the tungsten powder product has an average diameter of 2 micrometers. But temperature is not the only parameter affecting the particle size of the solid product: to the contrary, it has been observed that the tungsten particle size gradient (resulting from the reduction reaction at a given temperature) progressively increases with an increase in the partial pressure of water, the other product of the reaction. The water is capable of reacting with any unreacted tungsten trioxide to yield ortho-tungstic acid, WO2(OH)2. Applicants have observed that it is the relative volatility of the ortho-tungstic acid which appears to encourage tungsten particle growth and which ultimately determines the particle size of the tungsten carbide product achieved.

Applicants' invention involves including in the hydrogen reduction atmosphere an agent which consumes the water produced during the reduction reaction, to thereby limit particle growth by limiting the production of the ortho-tungstic acid. The preferred consumption agent is methane, although carbonaceous gases other than carbon monoxide and carbon dioxide are contemplated as equivalents. The advantage of a carbonaceous consumption agent such as methane is that the agent not only provides the carbon necessary for carburization of the tungsten, through the equilibrium reactions:

(2) $CH_4 \longleftrightarrow C + 2H_2$ and (3) $CH_4 + H_2O \longleftrightarrow CO + 3H_2$, the latter in turn providing carbon through the equilibrium reaction:

(4) $CO + H_2 \longleftrightarrow C + H_2O$;

but simultaneously providing for the consumption of water by the equilibrium reaction:

(5) $C + 2H_2O \longleftrightarrow CO + 2H_2$.

These interrelated equilibria are of course reversible and temperature dependent. Additionally, reaction (5) is subject to the competing equilibrium reaction:

(6) $CO_2 + C \longleftrightarrow 2CO$.

Unexpectedly, it is not necessary to attempt to quantify these equilibria in order to achieve substantially complete, direct conversion of tungsten trioxide to monotungsten carbide. Applicants have found that when an atmosphere of substantially fixed proportions of molecular hydrogen and the consuming agent are continuously supplied to tungsten trioxide, the partial pressure of the water produced in the reaction (and thus the conversion of tungsten trioxide to monotungsten carbide) can be completely regulated by a program of heating in which only the temperature, heating rates and residence or hold time need be controlled.

The present invention thus entails heating tungsten trioxide or another solid, tungsten-containing material in a flowing atmosphere containing molecular hydrogen and molecular methane (or another carbonaceous, water-consuming agent), and having a substantially fixed ratio of hydrogen to methane. In this regard, "molecular" means merely that no unusual steps are taken to place the hydrogen or methane in a dissociated state, for example, by photolysis or creation of plasma conditions, except insofar as incidental to heating at relatively low temperatures. The flowing atmosphere desirably contains a ratio of about 90 to 99 percent hydrogen to about 1 to 10 percent methane, and preferably 92 to 97 percent hydrogen to about 3 to 8 percent methane. The percentages can be determined on a molar (molecular) basis, a gas volume basis, or a gas partial pressure basis, as may be most convenient, since these measures appear to be essentially equivalent under the temperatures and pressures contemplated within the invention. The flowing atmosphere may include argon or another inert gas as a diluting agent, so long as the ratio of hydrogen to methane remains fixed. If the desired use of the micrograin monotungsten carbide requires minimal free carbon, the ratio of methane to hydrogen in the flowing atmosphere should be less than that dictated by the equilibrium decomposition reaction for methane at the peak temperature. When the reaction is performed in a continuous mode and the incoming gas composition is held constant, the reaction atmosphere and the product or exiting gas is of consistent composition.

The present invention also entails heating the tungsten trioxide for a time sufficient to convert substantially all of the tungsten trioxide. In this context, the term "substantially all" means at least 75 weight percent of the monotungsten carbide that can be formed is formed. Heating of the tungsten trioxide brings the temperature from ambient to a first elevated temperature of from about 520° C. to about 550° C., preferably about 535° C. To achieve this first elevated temperature, there is no particular heating rate required, although heating rates ranging from about 1 to about 50° C./minute are typical. After reaching the first elevated temperature, heating immediately continues to increase the temperature at a rate from about 3° to about 10° C./minute to achieve a second elevated temperature of about 800° to about 900° C., preferably about 850° C.

The temperature is held at the second elevated temperature until substantially all of the tungsten oxide is converted to monotungsten carbide. The holding time ranges from at least about 15 minutes to about 3 hours, preferably from about 30 minutes to 90 minutes, and depends on the temperature of the second elevated temperature. For example, if the second elevated temperature is about 900° C., the holding time should be at least about 15 minutes. If the second elevated temperature is about 800° C., the holding time should be at least about 90 minutes. At least about 50% of the reaction takes place during the holding time at the second elevated temperature. That is, at least about 50 weight % of the monotungsten carbide that can be formed from the tungsten trioxide is formed during the holding step. Usually, at least about 75 weight percent of the monotungsten carbide is formed during the holding step. If the temperature increases during the reaction are so slow that the reaction is completed or essentially completed by the time the second elevated temperature is reached, the product has a surface area that is higher than is desired and, correspondingly, a particle size which is smaller than desired.

The temperature selected for the first elevated temperature is about equal to the reported minimum temperature (537° C.) at which the reduction of tungsten trioxide to tungsten powder would be just complete in a pure hydrogen atmosphere. However, it is not essential to the success of the present invention that the first rate be slow enough to cause the reduction of the tungsten trioxide to be complete at the end of the first step; to the contrary, at the first elevated temperature the reactant powder is likely a rather complex mixture of products. What is important for the invention is that this mixture is fully reduced and carburized by the end of the hold time. The hold time must be long enough to complete carburization and to lower the level of free carbon in the resulting product to an acceptable amount. The acceptable level of free carbon or other contaminants (such as oxygen) depends upon the use to which the monotungsten carbide powder will be put. Typically, free carbon and oxygen levels of 1 and 2 percent or less by weight, respectively, are desired and can readily be achieved by the method of the present invention.

The tungsten trioxide (or other solid, tungsten-containing material) useful for conversion into monotungsten carbide by the method of the present invention requires no special pretreatment and need not possess any particular characteristics. The tungsten trioxide should be pure enough to give a monotungsten carbide product which has contaminants at or below any particular level desired or needed in view of the use to which the monotungsten carbide product will be put. The particle size of the tungsten trioxide should be reasonably uniform and small enough that the sample to be treated is evenly heated during practice of the method of the present invention. Preferably, tungsten trioxide having a particle diameter on the order of 25 micrometers is useful to yield monotungsten carbide particles having an average diameter between 0.05 and 0.2 micrometers. A particular tungsten trioxide powder useful in the practice of the present invention, having an average particle diameter from about 10 to about 30 micrometers and possessing adequate purity for most purposes, is sold by GTE Corporation under the name "GTE TO-3". It is preferred that the tungsten trioxide powder have a surface area of from 0.01 to 0.09 m$^2$/g. Tungsten trioxide having this surface area is the most widely available.

During the heating of the tungsten trioxide powder, it is advantageous that the flow rate of the atmosphere be as great as possible without entrainment or premature transport of the reactant tungsten trioxide or the monotungsten carbide product. For example, if the method of the present invention is carried out by placing and heating the tungsten trioxide powder in a space having a defined volume, for example, in a furnace, it is desirable that the atmosphere flow rate through the furnace be at least 1 furnace volume per minute, preferable that the atmosphere flow rate be at least 10 furnace volumes per minute, and particularly preferable that the atmosphere flow rate be about 100 furnace volumes per minute. The maximum flow rate will of course depend upon the physical form of the tungsten trioxide powder and the particle size of the product.

The monotungsten carbide formed by the method of this invention is cooled to ambient temperature naturally under a non-oxidative atmosphere. Typically, the rate of cooling is from about 10° to about 20° C./minute.

The monotungsten carbide formed by this invention typically has a particle size from about 0.05 to about 2 micrometers (equivalent to about 50 to about 200 nanometers) and a surface area from about 1 to about 10 m$^2$/g, more typically, from about 2 to about 8 m$^2$/g.

The nature of the apparatus employed for heating in the method of the present invention is believed not to be critical to the success of the method. In a continuous reactor the tungsten-containing material is traversed along a longitudinal path of travel within the reactor which has various temperature zones. For example, to perform the method of this invention, three temperature zones may be in the continuous reactor, each temperature zone higher than the last. For instance, the first temperature zone could be held at 535° C., the second, at 800° C., and the third, at 850° C. The rate of travel through the reactor, as well as the lengths of the temperature zones, can be used to ensure that the temperature of the tungsten-containing material increases at the proper rate. The apparatus should of course be selected as appropriate for the amount of tungsten trioxide to be treated. It is convenient to charge the tungsten trioxide to an inert carrier (such as a quartz boat) in order to facilitate handling. The carrier should be structured, and the quantity of tungsten trioxide placed in it selected, so as to ensure a constant flow of the flowing atmosphere throughout the treatment and to permit even heating of the tungsten trioxide. Stagnant areas or localized hot or cold spots may be expected to adversely affect the uniformity of the tungsten carbide product obtained.

A better understanding of the invention will be had upon reference to the following examples. Examples 3, 4, and 5 are comparative examples, as the majority of the product formed is not monotungsten carbide.

EXAMPLE 1

A 20 milligram sample of GTE TO-3 was placed into a thermal gravimetric analyzer (TGA) and heated in an atmosphere containing 97 percent molecular hydrogen and 3 percent molecular methane. The total gas flow through the TGA was approximately 0.27 liters per minute, corresponding to about 2 furnace volumes per minute. The sample was heated at a rate of 20° C. per minute from 25° C. to 535° C., then heated at a rate of 5° C. per minute from 535° C. to 850° C., and held for 90 minutes at 850° C. The weight of the sample was monitored during treatment. The sample began to lose weight at approximately 527° C. and reached a maximum of 19.66 percent weight lost at a temperature of approximately 651° C. After that point, the sample began to gain weight, and within 15 minutes had achieved a stable overall weight loss of approximately 17.83 percent by weight. It is believed that this stabilized weight corresponds roughly to the conversion of tungsten trioxide into ditungsten carbide; such a conversion has a theoretical weight loss of 18.12 percent. Upon further heating, at a temperature of approximately 567° C. the sample again began to gain weight, and eventually reached a steady state value of approximately 14.67 percent for the overall weight loss. It is believed that this weight loss corresponds roughly to the conversion of tungsten trioxide into monotungsten carbide; the theoretical weight loss for such a conversion is 15.53 percent. The resulting product was allowed to cool naturally to room temperature under a non-oxidative atmosphere and was found to be non-pyrophoric when exposed to air.

EXAMPLE 2

A three gram sample from the same lot number of GTE TO-3 as used in Example 1 was placed in a quartz boat and loaded into a horizontal tube furnace of cylindrical construction, having an inside diameter of 2 inches and a length of 16 inches. The volume of the furnace was thus about 0.82 liters. The sample of tungsten trioxide was subjected to the same temperature program as employed in Example 1 with the same atmosphere containing 97 percent molecular hydrogen and 3 percent molecular methane. The total gas flow for the atmosphere was 81.5 liters per minute. Upon completion of the hold time, the product was allowed to cool naturally to room temperature under a non-oxidative atmosphere and was found to be non-pyrophoric. X-ray diffraction analysis showed the sample to be composed solely of monotungsten carbide. The product was also subjected to scanning electron microscopy, which showed that the product retained the original shape of the tungsten trioxide precursor material, but was composed of individual particles having an average diameter of about 0.1 micrometers. The product was also analyzed for total carbon content using a LECO carbon analyzer. The overall carbon content of the product was 6.13 percent by weight. The surface area of the product was measured to be 4.0 m²/g.

EXAMPLE 3 — COMPARATIVE

A three gram sample from the same lot of GTE TO-3 as treated in Example 1 was placed into the horizontal tube furnace disclosed in Example 2. The sample was heated in a quartz boat under a flowing atmosphere of fixed proportions containing 95 percent molecular hydrogen and 5 percent molecular methane. The sample was heated at 20° C. per minute from 25° C. to 535° C., then heated at 5° C. per minute from 535° C. to 660° C., and held at 660° C. for 90 minutes. The total gas flow was again 81.5 liters per minute. After allowing the sample to cool naturally to room temperature under a non-oxidative atmosphere, the sample was analyzed by X-ray diffraction and found to contain a major portion of ditungsten carbide and a minor portion of monotungsten carbide. LECO carbon analysis showed the product to contain 3.57 percent by weight overall carbon and 2.60 percent by weight total oxygen.

EXAMPLE 4 — COMPARATIVE

A three gram sample of GTE TO-3 taken from the same lot as Example 1 was placed in a quartz boat in the horizontal tube furnace disclosed in Example 2. The sample was subjected to a flowing atmosphere of fixed composition including 60 percent molecular hydrogen and 40 percent molecular methane flowing at a rate of 81.5 liters per minute. The sample was heated at 20° C. per minute from 25° C. to 535° C., then at 5° C. per minute from 535° C. to 660° C., and then held at 660° C. for 90 minutes. The product was then allowed to cool naturally to room temperature under a non-oxidative atmosphere and analyzed by X-ray diffraction. The product was found to contain a major portion of ditungsten carbide and a minor portion of monotungsten carbide. LECO carbon analysis showed the sample to contain 6.46 percent by weight total carbon and 0.17 percent by weight oxygen.

EXAMPLE 5 — COMPARATIVE

A three gram sample of GTE TO-3 taken from the same lot as Example 1 was placed in a quartz boat in the horizontal tube furnace described in Example 2. The sample was heated in a flowing atmosphere containing 93 percent molecular hydrogen and 7 percent molecular methane. The sample was heated at 20° C. per minute from 25° C. to 535° C., then at 5° C. per minute from 535° C. to 750° C., and finally held at 750° C. for 90 minutes. The product was allowed to cool naturally to room temperature under a non-oxidative atmosphere and analyzed by X-ray diffraction. The product was found to contain large portions of both ditungsten carbide and monotungsten carbide. LECO carbon analysis showed the sample to contain 5.41 percent by weight total carbon and 0.87 percent by weight oxygen.

EXAMPLE 6

A three gram sample of GTE TO-3 taken from the same lot as Example 1 was placed in a quartz boat in the horizontal tube furnace disclosed in Example 2. The sample was then heated in an atmosphere of fixed proportion containing 96 percent molecular hydrogen and 4 percent molecular methane, flowing at a rate of 81.5 liters per minute. The sample was heated at 20° C. per minute from 25° C. to 535° C., then at 5° C. per minute from 535° C. to 800° C., and finally held for 90 minutes at 800° C. Upon allowing the sample to cool naturally to room temperature under a non-oxidative atmosphere, the product was analyzed by X-ray diffraction and was found to contain a major portion of monotungsten carbide and a minor portion of ditungsten carbide. LECO carbon analysis showed the product to contain 5.18 percent by weight total carbon and 1.60 percent by weight oxygen. The surface area of the product was measured to be 8.2m²/g.

EXAMPLE 7

Three grams of GTE TO-3 taken from the same lot as Example 1 were placed in a quartz boat in the horizontal tube furnace disclosed in Example 2. The sample was heated in a flowing atmosphere of fixed proportion containing 97 percent molecular hydrogen and 3 percent molecular methane. The sample was heated at 20° C. per minute from 25° C. to 535° C., then at 5° C. from 535° C. to 850° C., and finally held at 850° C. for 30 minutes. Upon allowing the product to cool naturally to room temperature, the product was analyzed by X-ray diffraction and found to contain a major portion of monotungsten carbide and only a trace of ditungsten carbide. The product was found by LECO carbon analysis to contain 6.07 percent by weight total carbon and 0.58 percent by weight oxygen. The surface area of the product was measured to be 4.5 m²/g.

EXAMPLE 8

A three gram sample of TO-3 taken from the same lot as Example 1 was subject to the same flowing atmosphere and temperature program as in Example 7, except that the hold time at 850° C. was 90 minutes. The product when cooled contained monotungsten carbide with no detectable trace of ditungsten carbide. LECO carbon analysis showed the product to contain 6.13 percent by weight total carbon. The surface area of the product was measured to be 4.1 m²/g.

EXAMPLE 9

A three gram sample of GTE TO-3 taken from the same lot as Example 1 was placed in a quartz boat in the horizontal tube furnace disclosed in Example 2 and heated in a flowing atmosphere of fixed composition containing 92 percent molecular hydrogen and 8 percent molecular methane. The sample was heated at 20° C. per minute from 25° C. to 535° C., then at 5° C. per minute from 535° C. to 850° C., and then held for 90 minutes at 850° C. The product was allowed to cool naturally to room temperature under a non-oxidative atmosphere and analyzed by X-ray diffraction. The product was found to contain monotungsten carbide with no detectable trace of ditungsten carbide present. The product contained 6.40 percent by weight total carbon, as determined by a LECO carbon analyzer. The surface area of the product was determined to be 4.9 m²/g.

EXAMPLE 10

A three gram sample of GTE TO-3 taken from the same lot as Example 1 was subject to the same heating program as disclosed in Example 9, except that the hold time at 850° C. was only 30 minutes. The same atmosphere composition and flow rate were employed. When cooled, the product was found by X-ray diffraction analysis to contain monotungsten carbide with no detectable trace of ditungsten carbide. LECO carbon analysis showed the product to contain 6.20 percent by weight total carbon. The surface area of the product was determined to be 4.5 m²/g.

EXAMPLE 11

Four samples of about 20 mg of GTE TO-3 tungsten oxide were reacted according to the invention as Examples 11A–D. Each sample was placed into a thermal gravimetric analyzer (TGA) and heated in an atmosphere containing 97 percent molecular hydrogen and 3 percent molecular methane. The total gas flow through the TGA was approximately 0.27 liters per minute, corresponding to about 2 furnace volumes per minute. Each sample was heated at a rate of 20° C. per minute from 25° C. to 535° C., then heated at a rate of 5° C. per minute from 535° C. to a selected elevated temperature, and held for 90 minutes at the selected elevated temperature. The selected elevated temperature for the first sample (Example 11A) was 800° C.; for the second sample (Example 11B), 825° C.; for the third sample (Example 11C), 850° C.; and for the fourth sample (Example 11D), 900° C.

In each example, the sample first lost weight during heating to a maximum percent weight loss which was recorded as Weight % #1. As the temperature continued to increase, each sample then gained weight and achieved a stable overall percent weight loss which was recorded as Weight % #2. Weight % #2 generally represents the completion of the reaction from tungsten oxide to ditungsten carbide. As the temperature continued to increase, each sample gained more weight and reached a steady state percent weight loss which was recorded as Weight % #3. Weight % #3 generally represents the completion of the reaction from ditungsten carbide to monotungsten carbide.

In Example 11A, both monotungsten and ditungsten carbides were formed, wherein greater than 50 weight percent of the product was monotungsten carbide. In Examples 11B–11D, the product formed was substantially all monotungsten carbide.

Table 1 provides Weight % #'s 1, 2, and 3 for Examples 11A–D. The percent of the conversion from ditungsten carbide to monotungsten carbide that occurs at the selected elevated temperature was determined and is also provided in Table 1. The surface areas of the products were determined by the BET method and are also provided in Table 1.

EXAMPLE 12

A three gram sample of GTE TO-3 tungsten oxide taken from the same lot as Example 1 was placed in a quartz boat in the horizontal tube furnace disclosed in

TABLE 1

| Example # | Weight % #1 | Weight % #2 | Weight % #3 | Percent Conversion | Surface Area (M²/g) |
|---|---|---|---|---|---|
| 11A | 19.25 | 17.23 | 15.51 | 100 | 8.2 |
| 11B | 18.96 | 17.45 | 14.73 | 100 | 6.9 |
| 11C | 19.66 | 17.83 | 14.67 | 81 | 4.2 |
| 11D | 19.75 | 17.67 | 13.83 | 53 | 2.2 |

Example 2. The sample was then heated in an atmosphere of fixed proportion containing 96% molecular hydrogen and 4% molecular methane, flowing at rate of 81.5 standard liters per minute. The sample was heated at 20° C. per minute to 535° C., than at 5° C. per minute to 900° C., and the temperature was held at 900° C. for 90 minutes. Upon cooling, the product was analyzed by x-ray diffraction and was found to be solely composed of WC. LECO analysis indicated that the product contained 6.15 wt % total carbon and 0.45 wt % oxygen. The surface area of the product measured by the BET method was found to be approximately 2.1 m²/g. SEM indicated that the product was approximately 0.2 microns in diameter.

EXAMPLE 13

A three-zone horizontal tube furnace of cylindrical construction, having an inside diameter of 2 inches and a length of 48 inches was equipped with entrance and exit ports. The hot zone was 36 inches long. The ports allowed boats of material to be inserted and removed from the furnace while maintaining the temperature and atmosphere conditions in the furnace. The first, second, and third zones of the furnace were maintained at 535° C., 800° C., and 850° C., respectively. The furnace was brought to temperature under flowing argon and then 80 standard liters per minute of 3% molecular methane and 97% molecular hydrogen were introduced.

After the atmosphere in the furnace had been switched to methane/hydrogen, a first quartz boat (boat #1) containing approximately 20 g of GTE TO-3 tungsten oxide was inserted into the entrance port, purged with argon, and then moved into zone 1 which had a temperature of 535° C. After one hour, a second boat (boat #2) containing 20 g of tungsten oxide was inserted into the entrance port, purged with argon, and then moved into zone 1. At the same time, boat #1 was moved into zone 2 which had a temperature of 800° C. This procedure was repeated one more time so that there was one boat in each of the three zones. After another hour, so that 3 hours had elapsed from the beginning of the experiment, a fourth boat (boat #4) was inserted and boat #1 was removed and allowed to cool under argon back to room temperature. This entire procedure was repeated until 7 boats had been taken out of the furnace. Analysis of the products showed it to be essentially identical to that produced in Example 2. The temperature distribution within the reactor coupled with the one hour residence time per zone resulted in a heating rate from 535° C. to 850° C. of approximately 5° C. per minute and a soak of 1 hour at 850° C.

The above procedure is a simple procedure where the only variables that must be controlled are furnace temperature distribution and throughput rate. This procedure could be easily scaled to another continuous reactor, such as, a larger tube furnace, a pusher furnace, or a rotary kiln.

EXAMPLE 14 — COMPARATIVE 30 mg of GTE TO-3 tungsten oxide was placed into a thermal gravimetric analyzer (TGA) and treated in the same manner, except for the heating schedule, as that described in Example 1. The sample was heated at a rate of 20° C. per minute from 25° C. to 535° C., then heated at a rate of 1° C. per minute from 535° C. to 850° C., and then allowed to cool naturally back to room temperature. The sample began to lose weight at approximately 527° C. and reached a maximum weight loss of 20.6% weight loss at 620° C. which is close to the theoretical value for the weight loss from tungsten oxide to tungsten. At approximately 655° C. the sample began to slowly gain weight. At 830° C. the sample stopped gaining weight for an overall weight loss of 15.40%, which indicated that the reaction was completed by the time the temperature reached 830° C., forming monotungsten carbide. The resulting product was found to be pyrophoric in that it rapidly oxidized and began to heat under exposure to air and ambient conditions. Since the product was pyrophoric, it was unacceptable for use in mass production of cutting tools or abrasive parts.

EXAMPLE 15 — COMPARATIVE

A 3 gram sample of GTE-TO-3 tungsten oxide was placed into the horizontal tube furnace disclosed in Example 2. The sample was heated in a 3% molecular methane/97% molecular hydrogen atmosphere according to the heating schedule disclosed in Example 14. After the resulting product had cooled back to room temperature it was removed from the reactor and immediately placed into an argon-purged quartz bottle. The surface area of the product was measured using the BET method to be 48 $m^2/g$. X-ray diffraction of the product indicated that it was composed almost entirely of WC. The overall carbon content was measured to be 6.09 wt %.

None of the products of Examples 2-10 contained any detectable trace of tungsten metal which had not combined with carbon in one form or another. The monotungsten carbide or major portions of monotungsten carbide obtained in Examples 2 and 5-10 all possessed average particle diameters between 0.05 and 0.2 micrometers.

In the present invention, the only physical parameter changed during the performance of the method is temperature; and temperature is a very easily and economically controlled parameter. Since a constant flowing atmosphere of substantially fixed proportion is employed, the present invention economically eliminates the prior need for careful regulation of the partial pressures of carbon monoxide and carbon dioxide (or other reactant gases) during the conversion of tungsten trioxide or another solid, tungsten-containing material into monotungsten carbide. The present invention also economically eliminates the need for mechanisms connected to the treatment furnace for supplying changing atmospheres during different steps in the treatment process. The present invention also enjoys cost savings in that no special pre-treatment of the tungsten trioxide or other material is required in order to achieve the benefits enjoyed by the invention.

While our invention has been described in terms of several specific embodiments, it must be appreciated that other embodiments could readily be adapted by one skilled in the art. Accordingly, the scope of our invention is to be limited only by the following claims.

We claim:

1. A method for forming monotungsten carbide having a particle size from 50 to 200 nanometers, comprising heating a solid, non-elemental tungsten-containing material in a flowing atmosphere containing molecular hydrogen and molecular methane for a time sufficient to convert substantially all of the tungsten-containing material to monotungsten carbide and in the process forming water, the heating bringing the temperature of the tungsten-containing material to a first elevated temperature of from about 520° to about 550° C. and, subsequently, at a rate of from about 3° to about 10° C. per minute, the heating bringing the temperature from the first elevated temperature to a second elevated temperature of about 800° to about 900° C. "with control of the temperature and partial pressure of water to produce said particle size", and thereafter holding the temperature at the second elevated temperature for at least about 15 minutes to form monotungsten carbide having a particle size from 50 to 200 nanometers, wherein at least about 50 weight percent of the monotungsten carbide formed is formed while holding the temperature at the second elevated temperature.

2. The method of claim 1, wherein the non-elemental tungsten-containing material is tungsten oxide.

3. The method of claim 1, wherein the non-elemental tungsten-containing material has a surface area of from 0.01 to 0.09 m$^2$/g.

4. The method of claim 1, wherein the heating rate to the first elevated temperature is from about 1° C./minute to about 50° C./minute.

5. The method of claim 1, wherein the holding at the second elevated temperature is for a period from about 15 minutes to about 3 hours.

6. The method of claim 1, further comprising cooling the formed monotungsten carbide at a rate of from about 10° to about 20° C./minute in a non-oxidative atmosphere.

7. The method of claim 1, wherein the monotungsten carbide formed has a surface area of from about 1 to about 10 m$^2$/g.

8. The method of claim 1, wherein the heating of the non-elemental tungsten-containing material is performed in a continuous reactor wherein the tungsten-containing material is traversed along a longitudinal path of travel within the continuous reactor.

9. The method of claim 1, wherein the flowing atmosphere is of consistent composition.

10. A method for forming monotungsten carbide having a particle size from 50 to 200 nanometers, comprising heating tungsten oxide in a flowing atmosphere containing molecular hydrogen and molecular methane for a time sufficient to convert substantially all of the tungsten oxide to monotungsten carbide and in the process forming water, the heating bringing the temperature of the tungsten oxide to a first elevated temperature of from about 520° to about 550° C. and, subsequently, at a rate of from about 3° to about 10° C. per minute, the heating bringing the temperature from the first elevated temperature to a second elevated temperature of about 800° to about 900° C. "with control of the temperature and partial pressure of water to produce said particle size", and thereafter holding the temperature at the second elevated temperature for at least about 15 minutes to form monotungsten carbide having a particle size from 50 200 nanometers, wherein at least about 50 weight percent of the monotungsten carbide formed is formed while holding the temperature at the second elevated temperature.

11. The method of claim 10, wherein the non-elemental tungsten-containing material has a surface area of from 0.01 to 0.09 m$^2$/g.

12. The method of claim 10, wherein the heating rate to the first elevated temperature is from about 1° C./minute to about 50° C./minute.

13. The method of claim 10, wherein the holding at the second elevated temperature is for a period from about 15 minutes to about 3 hours.

14. The method of claim 10, further comprising cooling the formed monotungsten carbide at a rate of from about 10° to about 20° C./minute in a non-oxidative atmosphere.

15. The method of claim 10, wherein the monotungsten carbide formed has a surface area of from about 1 to about 10 m$^2$/g.

16. The method of claim 10, wherein the heating of the non-elemental tungsten-containing material is performed in a continuous reactor wherein the tungsten-containing material is traversed along a longitudinal path of travel within the continuous reactor.

17. The method of claim 10, wherein the flowing atmosphere is of consistent composition.

* * * * *

UNITED STATES PATENT AND TRADEMARK OFFICE
CERTIFICATE OF CORRECTION

PATENT NO. : 5,372,797

DATED : December 13, 1994

INVENTOR(S) : Stephen D. Dunmead, et al.

Page 1 of 2

It is certified that error appears in the above-identified patent and that said Letters Patent is hereby corrected as shown below:

On the title page, section [57], abstract, line 6, "material to monotungsten carbide, The heating brings the", should correctly read --material to monotungsten carbide. The heating brings the--.

Column 14, line 60, "temperature of about 800° to about 900°C. "with control of the temperature and partial pressure of water to produce said particle size", and thereafter holding the temperature", should correctly read --temperature of about 800° to about 900°C with control of the temperature and partial pressure of water to produce said particle size, and thereafter holding the temperature--.

Column 16, line 3, "800°C to about 900°C. "with control of the temperature and said partial pressure of water to produce said particle size", and thereafter holding the temperature at the", should correctly read --800°C to about 900°C with control of the temperature and said partial pressure of water to produce said particle size--.

UNITED STATES PATENT AND TRADEMARK OFFICE
CERTIFICATE OF CORRECTION

PATENT NO. : 5,372,797
DATED : December 13, 1994
INVENTOR(S) : Stephen D. Dunmead, et al.

It is certified that error appears in the above-indentified patent and that said Letters Patent is hereby corrected as shown below:

Column 16, line 8, "size from 50 200 nanometers, wherein at least about 50", should correctly read --size from 50 to 200 nanometers, wherein at least about 50--.

Signed and Sealed this

Thirtieth Day of January, 1996

Attest:

BRUCE LEHMAN

Attesting Officer

Commissioner of Patents and Trademarks